March 7, 1944. G. WHITE 2,343,490
APPARATUS FOR USE IN TEMPERING GLASS
Filed April 4, 1940 4 Sheets-Sheet 1

Inventor
GERALD WHITE.
By Frank Fraser
Attorney

March 7, 1944. G. WHITE 2,343,490
APPARATUS FOR USE IN TEMPERING GLASS
Filed April 4, 1940 4 Sheets-Sheet 2
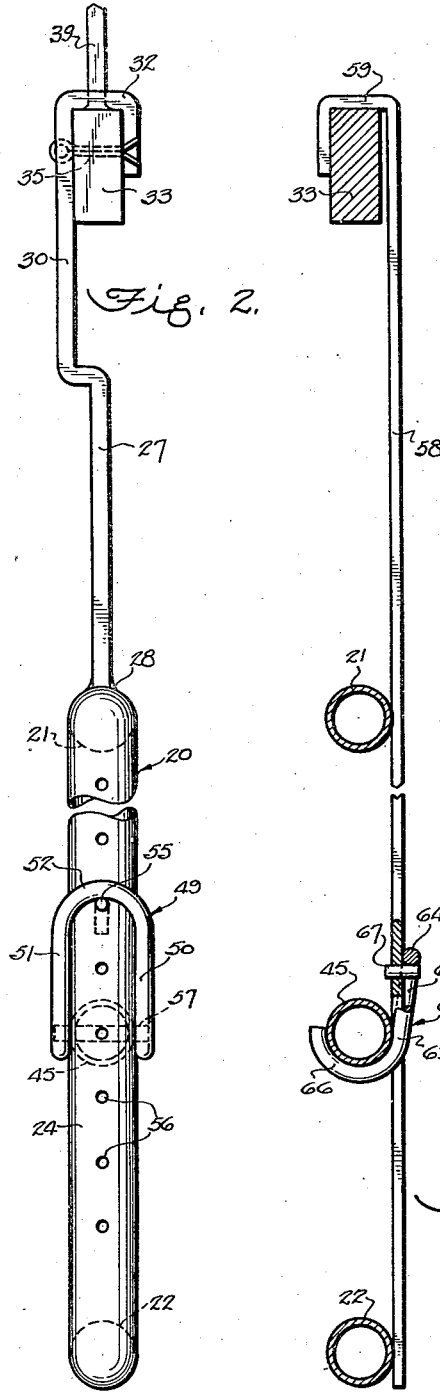
Fig. 2.
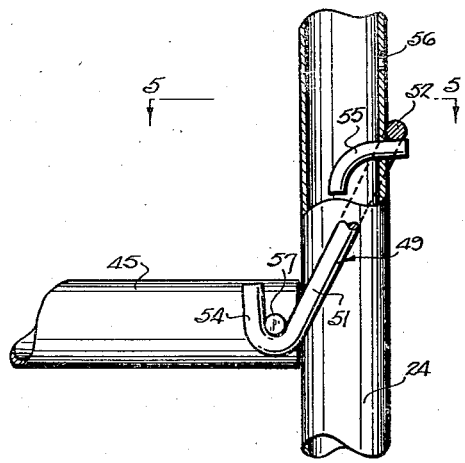
Fig. 4.
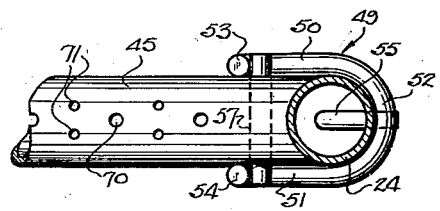
Fig. 5.
Fig. 3.
Inventor
GERALD WHITE
By Frank Fraser
Attorney March 7, 1944.  G. WHITE  2,343,490
APPARATUS FOR USE IN TEMPERING GLASS
Filed April 4, 1940  4 Sheets-Sheet 3
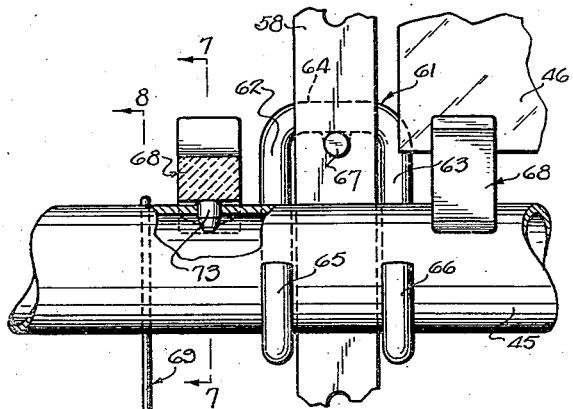
Fig. 6.
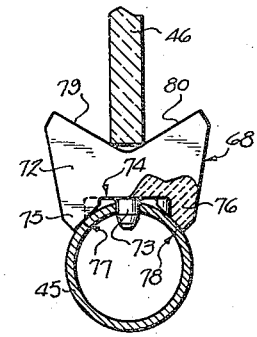
Fig. 7.
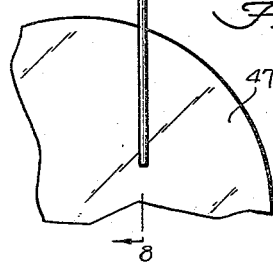
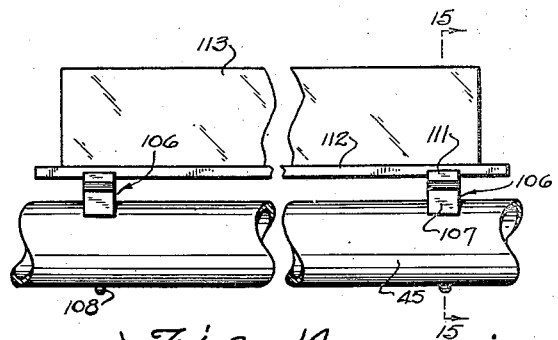
Fig. 14.
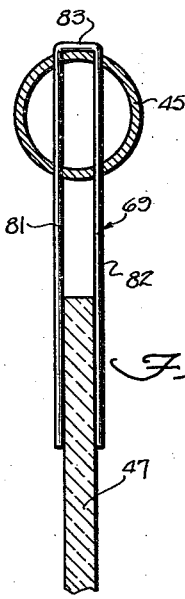
Fig. 8.
Fig. 15.
Inventor
GERALD WHITE.
By Frank Fraser,
Attorney March 7, 1944. G. WHITE 2,343,490
APPARATUS FOR USE IN TEMPERING GLASS
Filed April 4, 1940 4 Sheets-Sheet 4

Inventor
GERALD WHITE,
By Frank Fraser
Attorney

Patented Mar. 7, 1944

2,343,490

UNITED STATES PATENT OFFICE 2,343,490

APPARATUS FOR USE IN TEMPERING GLASS

Gerald White, Toledo, Ohio, assignor to Libbey-Owens-Ford Glass Company, Toledo, Ohio, a corporation of Ohio Application April 4, 1940, Serial No. 327,845

13 Claims. (Cl. 49—45)

This invention relates broadly to apparatus for use in the tempering of glass wherein the glass is heated to a temperature approximating the softening point and then rapidly cooled and, more particularly, to the means for supporting the glass during the heating and cooling operations.

An important object of the invention is the provision of improved means for supporting the glass to be tempered and particularly relatively small or curved plates very securely but with considerably less liability of breakage or cracking of the glass and with practically no marring of the surfaces thereof.

Another important object of the invention is the provision of improved means for supporting a plurality of glass plates to be tempered simultaneously and which is readily adaptable to different sized plates and also to plates of widely varying form.

A further important object of the invention is the provision of improved means for supporting the glass plates in such a way as to permit expansion and contraction thereof without danger of warpage and which has a minimum amount of surface contact with the glass.

A still further important object of the invention is the provision of improved supporting means which permits of the ready placement of the glass plates thereupon and their removal therefrom and which is capable of handling plates of different thicknesses; said supporting means being of such character that it will effectively withstand the elevated temperatures to which it is subjected during the heating operation.

Other objects and advantages of the invention will become more apparent during the course of the following description, when taken in connection with the accompanying drawings.

In the drawings, wherein like numerals are employed to designate like parts throughout the same:

Fig. 2 is an end view thereof;

Fig. 3 is a vertical section taken substantially on line 3—3 of Fig. 1;

Fig. 4 is a detail view, partially in section, of one of the supporting yokes;

Fig. 5 is a horizontal section taken substantially on line 5—5 of Fig. 4;

Fig. 6 is a front elevation, partially broken away, of the means for supporting the glass plates;

Fig. 7 is a vertical section taken substantially on line 7—7 of Fig. 6;

Fig. 8 is a vertical section taken substantially on line 8—8 of Fig. 6;

Fig. 14 is a front elevation of a further type of supporting means; and

Fig. 15 is a vertical section taken substantially on line 15—15 of Fig. 14.

Figure 1:
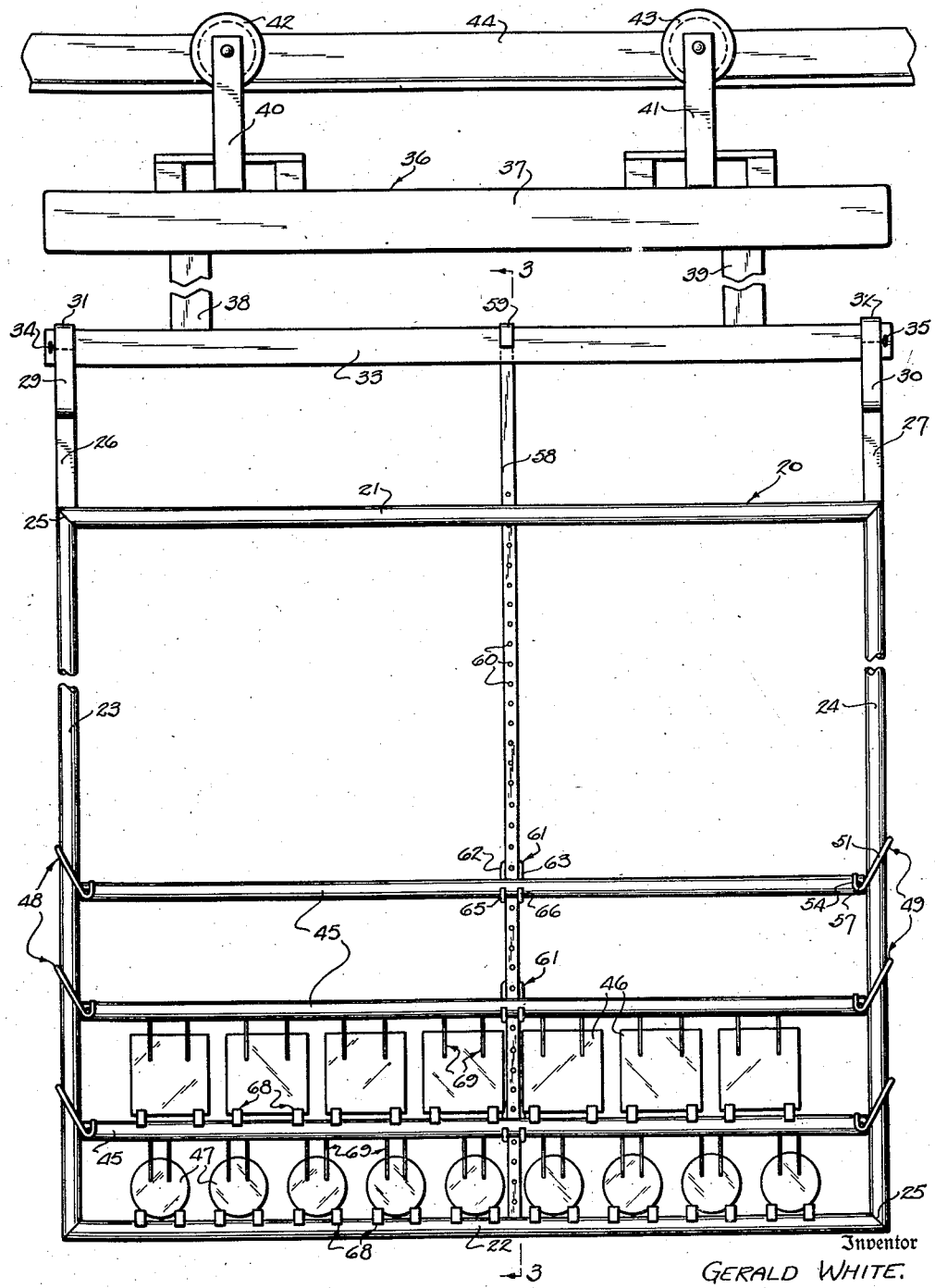
Fig. 1 is a front view of a glass supporting means constructed in accordance with the invention.

With reference now to the drawings and particularly to Figs. 1 to 8, inclusive, the supporting means comprises a rectangular frame 20 composed of the top and bottom horizontal tubular members 21 and 22 and the vertical side tubular members 23 and 24; the top, bottom, and side members being welded or otherwise suitably secured together at their adjacent ends as at 25. The supporting frame 20 is carried at its opposite ends by vertical hangers 26 and 27 welded or otherwise suitably secured at their lower ends to the frame as at 28 (Fig. 2). The upper end portions 29 and 30 of the hangers 26 and 27 respectively are laterally offset and provided with the inverted U-shaped hooks 31 and 32 which fit over a horizontal supporting bar 33. The laterally offset portions 29 and 30 of the hangers are provided in order that the frame 20 will hang directly beneath the supporting bar 33 as shown in Fig. 2. The hangers 26 and 27 are held upon the supporting bar 33 by cotter pins or the like 34 and 35 carried at the opposite ends of said bar. The supporting bar 33 is suspended from a carriage 36 including a horizontal supporting beam 37 to which the bar 33 is secured by straps 38 and 39. Secured to the top of the supporting beam 37 are upstanding brackets 40 and 41 carrying rollers 42 and 43 respectively which are mounted upon and run along a horizontal monorail 44.

Extending between and carried by the vertical side members 23 and 24 of supporting frame 20 are a plurality of horizontal, preferably tubular, supports 45 which support and maintain the plates of glass to be tempered. In Fig. 1, the numeral 46 designates a plurality of relatively small rectangular glass plates which are carried between two adjacent horizontal supports 45, while the numeral 47 designates a plurality of relatively small glass disks such as port lights supported by one of the horizontal supports 45 and the horizontal bottom member 22 of the frame. As will be more fully hereinafter described, each horizontal support 45 is provided with means for supporting the lower edges of glass plates positioned thereabove and also with retaining elements for engaging the upper edges of the glass plates carried by the next lower support 45 or by the bottom member 22 of the frame.

The horizontal tubular supports 45 are adjustably carried by the frame 20 so that they may be moved vertically relative to one another to accommodate therebetween glass plates of varying shapes and sizes. Each horizontal support 45 is carried at its opposite ends by yokes 48 and 49 removably associated with the vertical side members 23 and 24 respectively of said frame. As best shown in Figs. 2, 4, and 5, each of the yokes 48 and 49 is substantially U-shaped and comprises spaced legs 50 and 51 connected at their outer ends by a curved bite portion 52. The opposite free ends of the legs 50 and 51 are bent upwardly to provide the hook portions 53 and 54 respectively. Secured to the bite portion 52 of the yoke is an inwardly directed substantially horizontal pin 55 having its free end curved downwardly as illustrated in Fig. 4. The pin 55 is adapted for selective engagement with any one of a plurality of vertically spaced openings 56 in the respective tubular side member 23 or 24 of frame 20. Each horizontal support 45 has inserted transversely therethrough at its opposite ends horizontal pins 57; said pins projecting at their opposite ends beyond said support and adapted to be received within the hook portions 53 and 54 of the yokes 48 and 49.

In mounting the horizontal supports 45 upon the frame 20, the outer curved ends of the pins 55 of the yokes 48 and 49 are first inserted within the desired openings 56 in the side members 23 and 24 of said frame, after which said yokes are rotated about horizontal axes to the position shown in Fig. 4 where the legs 50 and 51 thereof incline inwardly and downwardly. The opposite ends of the horizontal supports 45 are then positioned between the legs 50 and 51 of the yokes and the projecting end portions of the transverse pins 57 supported in the hook portions 53 and 54 of said yokes. The yokes therefore serve as hangers to freely carry the horizontal supports 45, and as a result, the said supports can be easily and conveniently set in place or removed. Likewise, the yokes can be readily and conveniently adjusted vertically to the desired positions along the side members 23 and 24 of the supporting frame 20.

Due to the elevated temperatures to which the supporting frame is subjected in the heating of the glass, there may sometimes be a tendency for the horizontal supports 45 to sag and this is particularly true when relatively long supports are employed. In order to minimize this liability of sagging of the horizontal supports, there is preferably provided a vertical bracing strap 58; said strap being positioned substantially intermediate the ends of the frame 20 and provided at its upper end with a hook portion 59 which fits over the horizontal bar 20. The strap 58 is provided with a plurality of spaced openings 60, and adapted for selective association with these openings are hangers 61, one being provided for each horizontal support 45.

Each of the hangers 61 comprises a pair of spaced substantially vertical legs 62 and 63 connected at their upper ends by a transverse bite portion 64 and having their lower ends bent upwardly to provide the cradle portions 65 and 66 respectively which are arranged beneath and carry the respective horizontal support 45. Welded or otherwise suitably secured to the bite portion 64 of each hanger 61 is a horizontal pin 67 which is inserted within the desired opening 60 in the bracing strap 58.

The means for supporting and retaining the glass plates 46 and 47 in place are carried by the horizontal tubular supports 45 and by the top and bottom members 21 and 22 of the frame 20. Thus, each horizontal support 45 is adapted to carry a plurality of supporting blocks 68 for supporting the glass plates at their lower edges and also a plurality of depending wire retaining elements 69 which engage the upper edges of the glass plates carried by the next lower support. As shown in Fig. 5, each support 45 is provided with a series of openings 70 engageable by the supporting blocks 68 and arranged alternately with the openings 70 are the pairs of openings 71 for receiving the wire retaining elements 69.

The supporting blocks 68 are preferably formed of lava or some other desired refractory material and may be of the construction shown in Figs. 6 and 7. More specifically, each supporting block 68 comprises a body portion 72 arranged transversely of the support 45 and provided centrally thereof with a depending projection 73 adapted to be received within the desired opening 70 in said support. The bottom of the body portion of the block is notched to form a recess 74 resulting in depending end portions 75 and 76 having substantially flat faces 77 and 78 respectively which engage the tubular support 45 and serve to maintain the block in proper position thereupon and prevent rocking or wobbling thereof. The top of the block 68 is substantially V-shaped to provide the upwardly diverging surfaces 79 and 80. By employing supporting blocks of such construction, the lower edges of the glass plates can be properly located or centered upon the blocks and will be held against lateral shifting movement by the upwardly converging surfaces 79 and 80. Likewise, there is a minimum area of contact between the lower edges of the glass plates and the blocks, as clearly indicated in Fig. 7, wherein the outer corners only of the plate 46 contact the block 68.

The retaining elements 69 consist of inverted U-shaped wire clips comprising spaced leg portions 81 and 82 connected at their upper ends by the integral bite portions 83. These wire clips are inserted downwardly through the openings 71 in the horizontal supports 45 and receive the upper edges of the glass plates between the spaced legs thereof. Diametrically opposed pairs of openings 71 are provided in the tubular supports so that the legs of the clips can pass downwardly therethrough. The wire retaining elements are preferably formed of a non-corrosive heat resisting metal such as Nichrome, Monel metal, stainless steel, or the like.

From the above, it will be seen that the supporting frame 20 may be used to support a large number of relatively small plates of glass by proper adjustment of the horizontal supports 45 or it can be used to support larger sheets by removing one or more of said supports. Supporting blocks 68 are preferably carried by the bottom member 22 of the frame, while wire retaining elements 69 may be carried by the top member 21 thereof. The frame may be employed to support glass plates of different shapes and sizes and, in addition, the supporting blocks 68 and wire retaining elements 69 are adapted for supporting plates of different thicknesses. Moreover, the supporting blocks and wire retaining elements permit relative expansion and contraction of the glass without warpage in that they do not act as rigid confining members. Because of the limited contact of the glass with the supporting blocks and wire retaining elements, there is practically no danger of marring of the glass surfaces and, likewise, considerably less liability of breakage or cracking. Further, because of the minimum contact of the glass with the supporting means, the supporting means will not appreciably increase the rapidity of chilling of the glass at its points of support and thus tend to cause breakage.

Figure 9:
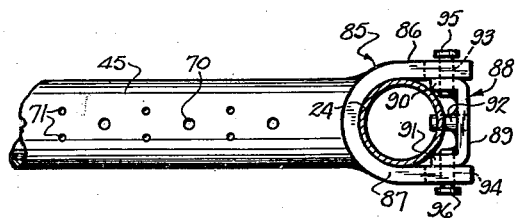
Fig. 9 is a horizontal section showing a modified type of supporting means.
Figure 11:
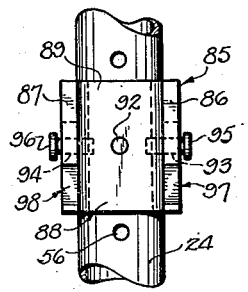
Fig. 11 is an end view thereof.
Figure 10:
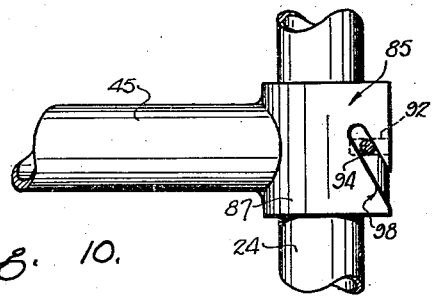
Fig. 10 is a front elevation thereof.

In Figs. 9, 10, and 11 is illustrated a modified type of means for connecting the horizontal tubular supports 45 to the vertical side members 23 and 24 of the supporting frame 20. As shown, each horizontal support 45 has secured to each end thereof a substantially U-shaped yoke 85 including the spaced legs 86 and 87 which straddle the respective side members 23 or 24 and project outwardly therebeyond. Received between the outer ends of the legs 86 and 87 of yoke 85 is a channel member 88 comprising a base portion 89 and the inturned end portions 90 and 91. Carried by the base portion 89 is a horizontal pin 92 adapted for selective engagement with the openings 56 in the side member of the frame. Carried by the end portions 90 and 91 of said channel member 88 are horizontal transverse pins 93 and 94 provided at their outer ends with heads 95 and 96 respectively. The legs 86 and 87 of yoke 85 are provided with upwardly and inwardly inclined slots 97 and 98 within which the pins 93 and 94 respectively are adapted to be received.

When securing the horizontal tubular support 45 in place, the pins 92 of channel members 88 are first inserted within the desired openings 56 in the side members 23 and 24 of frame 20. The horizontal support is then disposed between the side members of the frame, with the yokes 85 thereof embracing said side members. The horizontal support is then moved downwardly to engage the pins 93 and 94 within the inclined slots 97 and 98 of yokes 85. Upon continued downward pressure of the support, the said pins moving upwardly within the slots will serve to firmly secure said support in place.

Figure 13:
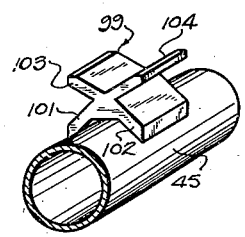
Fig. 13 is a perspective view thereof.
Figure 12:
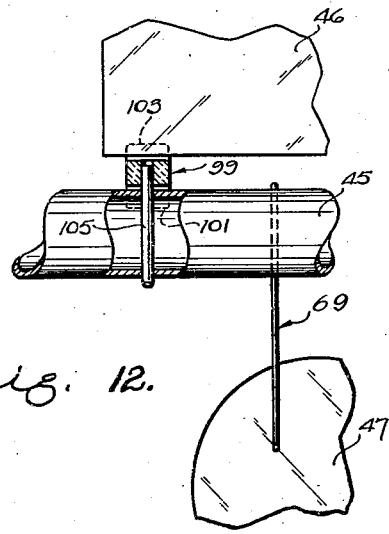
Fig. 12 is an elevation, partially in section, of another type of supporting means for the glass plates.

As shown in Figs. 12 and 13, the horizontal support 45 carries supporting blocks 99 and wire retaining elements 69. The wire retaining elements 69 are of the same construction as described above and associated with the support in the same manner. The supporting blocks 99, however, are of a slightly different construction, although they operate in the same way as blocks 68. Thus, the blocks 99 are substantially X-shaped to provide the spaced downwardly diverging legs 101 and 102 which fit over the tubular support 45 and the upwardly diverging legs 103 and 104 which receive therebetween the lower edges of the glass plates. The blocks 99 are secured to the support by vertical pins 105 which pass through the openings 70 in said support.

When tempering relatively thick or small pieces or strips of glass it is sometimes desirable to support said pieces or strips throughout their entire length rather than at spaced points. In such case, there may be carried by each horizontal support 45 a plurality of blocks 106 as shown in Figs. 14 and 15. Each block 106 comprises a body portion 107 associated with the tubular support 45 in the same manner as blocks 68 and secured to said support by a vertical pin 108. The block 106 is provided with a flat upper surface 109 and with upturned flanges 110 and 111 at opposite ends thereof. Extending between and carried by two or more blocks 106 is a longitudinally extending supporting plate 112 upon which the piece or strip of glass 113 to be tempered is placed. When using this type of supporting means, it is ordinarily not necessary to employ any wire retaining elements.

In operation, the glass plates or pieces of glass to be tempered are supported in the frame 20 by any one of the devices illustrated and described above, and then introduced into a furnace where the glass is heated to approximately the softening point thereof. The frame is then moved out of the furnace where the glass is subjected to a chilling action by blasts of air or chilled by any other suitable means. With the supporting means disclosed, a relatively large number of glass plates or pieces of glass may be simultaneously heated and chilled.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for supporting glass plates in a vertical position during a tempering operation, a frame including spaced vertical side members, vertically spaced horizontal supports carried by said side members and adapted to receive glass plates in a vertical position therebetween, each support being provided with a plurality of openings, supporting blocks having portions received within said openings for supporting glass plates thereupon at their lower edges, and means also carried by said supports and engaging the upper edges of the glass plates supported upon the next lower horizontal support.

2. In apparatus for supporting glass plates in a vertical position during a tempering operation, a frame including spaced vertical side members, vertically spaced horizontal supports carried by said side members and adapted to receive glass plates in a vertical position therebetween, each support being provided with a plurality of openings, supporting blocks carried by said supports for supporting glass plates thereupon at their lower edges, and wire retaining elements passing downwardly through the openings in said supports and engaging the upper edges of the glass plates supported upon the next lower support.

3. In apparatus for supporting glass plates in a vertical position during a tempering operation, a frame including spaced vertical side members, vertically spaced horizontal supports carried by said side members and adapted to receive glass plates in a vertical position therebetween, each support being provided with two series of openings, supporting blocks having portions received within the openings of one series for supporting glass plates thereupon at their lower edges, and wire retaining elements passing downwardly through the openings of the other series and engaging the upper edges of the glass plates supported upon the next lower horizontal support.

4. In apparatus for supporting glass plates in a vertical position during a tempering operation, a frame including spaced vertical side members, vertically spaced horizontal supports carried by said side members and adapted to receive glass plates in a vertical position therebetween, each support being provided with a plurality of openings, and supporting blocks having portions received within said openings for supporting glass plates thereupon at their lower edges.

5. In apparatus for supporting glass plates in a vertical position during a tempering operation, a frame including spaced vertical side members, vertically spaced horizontal supports carried by said side members and adapted to receive glass plates in a vertical position therebetween, each support being provided with a plurality of openings, and supporting blocks having portions received within said openings, each said supporting block having upwardly diverging upper surface portions for supporting glass plates thereupon at their lower edges.

6. In apparatus for supporting glass plates in a vertical position during a tempering operation, a frame including spaced vertical side members, vertically spaced horizontal tubular supports carried by said side members and adapted to receive glass plates in a vertical position therebetween, each support being provided with a plurality of openings, and supporting blocks mounted on said horizontal tubular supports, each comprising a body portion for supporting a glass plate thereupon at its lower edge and provided with a depending projection received within one of said openings and with portions at opposite sides of said projection for engaging its associated support to prevent rocking of said block thereon.

7. In apparatus for supporting glass plates in a vertical position during a tempering operation, a frame including spaced vertical side members, vertically spaced horizontal tubular supports carried by said side members and adapted to receive glass plates in a vertical position therebetween, each support being provided with a plurality of openings, and supporting blocks mounted on said horizontal tubular supports, each comprising a body portion having upwardly diverging upper surface portions for supporting a glass plate thereupon at its lower edge and provided with a depending projection received within one of said openings and with portions at opposite sides of said projection for engaging its associated support to prevent rocking of said block thereon.

8. In apparatus for supporting glass plates in a vertical position during a tempering operation, a frame including spaced vertical side members, vertically spaced horizontal supports arranged between said side members and adapted to receive glass plates in a vertical position therebetween, means carried by said supports for supporting the glass plates, yokes carried by the side members of said frame and being provided with hook portions, and means carried at the opposite ends of said supports for engaging the hook portions of said yokes.

9. In apparatus for supporting glass plates in a vertical position during a tempering operation, a frame including spaced vertical side members having spaced openings therein, vertically spaced horizontal supports arranged between said side members and adapted to receive glass plates in a vertical position therebetween, means carried by said supports for supporting the glass plates, yokes having portions adapted for selective engagement with the openings in the side members of said frame and being further provided with hook portions, and means carried at the opposite ends of said supports for engaging the hook portions of said yokes.

10. In apparatus for supporting glass plates in a vertical position during a tempering operation, a frame including spaced vertical side members, vertically spaced horizontal supports arranged between said side members and adapted to receive glass plates in a vertical position therebetween, means carried by said supports for supporting the glass plates, yokes carried at the opposite ends of said supports and having spaced legs straddling the side members of said frame, said legs being provided with upwardly and inwardly inclined slots, and members carried by the side members of said frame and having portions received within the slots in the legs of said yokes for supporting said supports.

11. In apparatus for supporting glass plates in a vertical position during a tempering operation, a frame including spaced vertical side members, vertically spaced horizontal supports arranged between said side members and adapted to receive glass plates in a vertical position therebetween, means carried by said supports for supporting the glass plates, yokes carried at the opposite ends of said supports and having spaced legs straddling the side members of said frame, said legs being provided with upwardly and inwardly inclined slots, and members having portions adapted for selective engagement with the openings in the side members of said frame and other portions received within the slots in the legs of said yokes for supporting said supports.

12. In apparatus for supporting glass during a tempering operation, a frame including spaced vertical side members, vertically spaced horizontal supports carried by said side members, supporting blocks carried by each of said supports, and a plate extending horizontally between and freely carried by said blocks for supporting the glass to be tempered.

13. In apparatus for supporting glass during a tempering operation, a frame including spaced vertical side members, vertically spaced horizontal supports carried by said side members and each being provided with a plurality of openings, blocks carried by each support and having portions received in the openings therein, and a plate extending horizontally between and freely carried by said blocks for supporting the glass to be tempered.

GERALD WHITE.